United States Patent [19]

Kochem et al.

[11] Patent Number: 6,017,616
[45] Date of Patent: Jan. 25, 2000

[54] BIAXIALLY ORIENTED FILM MADE FROM CYCLOOLEFINIC POLYMERS, ITS USE, AND PROCESS FOR ITS PRODUCTION

[75] Inventors: Karl-Heinz Kochem, Ingbert; Wolfgang Rasp, Homburg; Herbert Peiffer, Mainz; Wilfried Hatke, Hofheim, all of Germany

[73] Assignees: Ticona GmbH, Frankfurt, Germany; Mitsui, Japan

[21] Appl. No.: 08/972,982

[22] Filed: Nov. 19, 1997

[30] Foreign Application Priority Data

Nov. 20, 1996 [DE] Germany ............................ 196 47 954

[51] Int. Cl.⁷ ..................................................... B32B 27/08
[52] U.S. Cl. .................... 428/220; 156/244.11; 428/332; 428/336; 428/500; 428/515
[58] Field of Search ................................. 428/411.1, 457, 428/461, 500, 515, 332, 336; 156/244.11, 244.24

[56] References Cited

U.S. PATENT DOCUMENTS

| | | |
|---|---|---|
| 5,300,352 | 4/1994 | Honma ..................................... 428/212 |
| 5,532,030 | 7/1996 | Hirose et al. ........................... 428/35.7 |
| 5,534,606 | 7/1996 | Beennett et al. ........................... 526/281 |
| 5,552,504 | 9/1996 | Bennett et al. ....................... 526/348.1 |
| 5,583,192 | 12/1996 | Bennett et al. ....................... 526/348.1 |
| 5,693,414 | 12/1997 | Peiffer et al. ........................... 428/327 |
| 5,707,728 | 1/1998 | Brekner et al. ......................... 428/332 |

FOREIGN PATENT DOCUMENTS 2221956  4/1998  Canada .

*Primary Examiner*—Paul Thibodeau
*Assistant Examiner*—Sheeba Ahmed
*Attorney, Agent, or Firm*—Connolly Bove Lodge & Hutz LLP

[57] ABSTRACT

The invention relates to a film having more than one layer and made from cycloolefin polymers and having a base layer and at least one outer layer, the base layer being built up essentially from a cycloolefin polymer COP having a glass transition temperature Tg and the outer layer being built up essentially from a mixture of cycloolefin polymers, wherein the mixture of cycloolefin polymers comprises at least two cycloolefin polymers $COP_1$ and $COP_2$ whose glass transition temperatures $Tg_1$ and $Tg_2$ differ by at least 5° C., where $Tg_2-Tg_1 \geq 5°$ C. and at the same time the condition $Tg_2-Tg \geq 5°$ C. is fulfilled.

29 Claims, No Drawings

BIAXIALLY ORIENTED FILM MADE FROM CYCLOOLEFINIC POLYMERS, ITS USE, AND PROCESS FOR ITS PRODUCTION

The invention relates to a film having more than one layer and made from cycloolefin polymers and having a base layer and at least one outer layer, the base layer being built up essentially from cycloolefin polymers COPs having a glass transition temperature Tg and the outer layer being built up essentially from a mixture of cycloolefin polymers. The invention also relates to the use of the film and to a process for its production. The novel film is distinguished by improved processing performance and improved electrical properties. It is excellent for use as a capacitor dielectric.

Cycloolefin polymers are known materials distinguished by high heat resistance, high modulus of elasticity, low water absorption and good dielectric properties. Films made from cycloolefin polymers are likewise known in the prior art.

DD-A-224 538 describes the production of films from norbomene-ethylene copolymers by a film casting process. The European applications EP-A-0 384 694, EP-A-0 610 814, EP-A-0 610 815 and EP-A-0 610 816 describe the production of cycloolefin polymer films by melt extrusion. The mechanical properties are improved by monoaxial or biaxial orientation of the films.

DD-241 971 and DD-224 538 state that films made from cycloolefin polymers are distinguished by low dielectric dissipation factors (tan δ). It is stated that tan δ for COC films can be up to $1.2 \cdot 10^{-5}$. It is further stated in DD-241 971 that low values of tan δ are of particular interest for high-frequency alternating-current applications of the films, since electrical power losses in the film and temperature rises can then be avoided.

EP-A-0 384 694 describes that cycloolefin polymers can be mono- and biaxially oriented, to give oriented films. The text states that the polymers must be heated to temperatures above their glass transition temperatures before being stretched. Mention is made that additives, such as antiblocking agents, can be added to the film to avoid blocking during further processing. There is no mention in the text of electrical properties of the films made from cycloolefin polymers.

EP-A-0 610 814, EP-A-0 610 815 and EP-A-0 610 816 relate to films having one or more layers and made from cycloolefin copolymers (COCs), and to their use as capacitor dielectrics. Mono- or biaxial orientation in a temperature range from 40° C. below the glass transition temperature of the COC to 50° C. above this temperature is described. It is recommended that fine inert particles are incorporated into the film to improve its ease of further processing and its slip and winding characteristics. Examples of inert particles mentioned are $SiO_2$, $Al_2O_3$, silicates, carbonates, sulfides, polytetrafluoroethylene, talc, lithium fluoride and various salts of organic acids.

The known films made from cycloolefin polymers are unsatisfactory in their ease of further processing and in particular in their slip and winding characteristics. Furthermore, there is a requirement for excellent electrical properties, such as low electrical dissipation factor and high breakdown voltage. These advantages may not be impaired by improvement in slip and winding characteristics.

It is known that when use is made of the known non-polymeric organic and/or inorganic antiblocking agents, the particles have poor adhesion to the cycloolefin polymer matrix. Moreover there is the danger of formation of voids (vacuoles) during stretching. Both phenomena lead to extremely undesirable deterioration in the electrical properties of the film.

In the application sectors which are by far the most frequently encountered, capacitor films are metallized. Unfortunately, the additives mentioned above frequently cause problems in metallization of the film surface. The metal layer adheres poorly to projecting particles and additionally becomes imperfect when the antiblock agents lose their adhesion. Poor adhesion of the metal and defects in the metal layer are particularly problematic in capacitor films. The result is, in particular, deterioration in the dissipation factors, and the film is no longer usable for its intended application.

The object of the present invention was to avoid the disadvantages described above of known films. In particular, a cycloolefin polymer film should be provided which has good slip and good electrical properties. The film should be easy to process, have low friction, and not block. The improvement in slip characteristics must, however, not impair the usability of the film as a capacitor film. It must therefore in particular have a low electrical dissipation factor.

The object of the invention has been achieved by means of a film of the type mentioned at the outset, the characteristics features of which are that the cycloolefin polymer mixture of the outer film comprises at least two cycloolefin polymers $COP_1$ and $COP_2$ whose glass transition temperatures $Tg_1$ and $Tg_2$ differ by at least 5° C., where $Tg_2 - Tg_1 \geq 5°$ C. and at the same time the condition $Tg_2 - Tg \geq 5°$ C. is fulfilled.

The base layer of the novel film is made from cycloolefin polymers or from cycloolefin polymer mixtures. The base layer generally comprises from 90 to 100% by weight of cycloolefin polymer or mixture and additionally, if desired, effective amounts of customary additives. The base layer preferably comprises from 95 to 99% by weight, in particular from 98 to 99% by weight, of cycloolefin polymers or mixture. The data in % by weight are based on the weight of the base layer.

For the purposes of the present invention, cycloolefin polymers are homopolymers or copolymers which contain polymerized cycloolefin units and, if desired, acyclic olefins as comonomer. Suitable cycloolefin polymers for the present invention are those which comprise from 0.1 to 100% by weight, preferably from 10 to 99% by weight, in particular from 50 to 95% by weight, based in each case on the total weight of the cycloolefin polymer, of polymerized cycloolefin units. Preference is given to polymers which are built up from cyclic olefins of the formulae I, II, III, IV, V or VI:

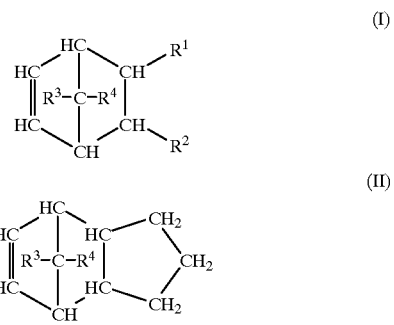

-continued

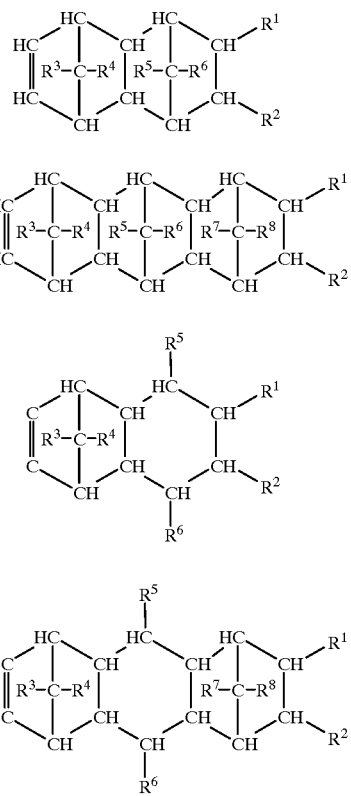

where $R^1$, $R^2$, $R^3$, $R^4$, $R^5$, $R^6$, $R^7$ and $R^8$ are identical or different and are a hydrogen atom or a $C_1$–$C_{30}$-hydrocarbon radical or where two or more radicals $R^1$ to $R^8$ are bonded in a ring, and where the meaning of the same radical may be different in different formulae. Examples of $C_1$–$C_{30}$-hydrocarbon radicals are a linear or branched $C_1$–$C_8$-alkyl radical, $C_6$–$C_{18}$-aryl radical, $C_7$–$C_{20}$-alkylenearyl radical, a cyclic $C_3$–$C_{20}$-alkyl radical and an acyclic $C_2$–$C_{20}$-alkyl radical.

If desired, the cycloolefin polymers can contain from 0 to 45% by weight, based on the total weight of the cycloolefin polymers, of polymerized units of at least one monocyclic olefin of the formula VII:

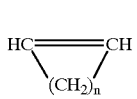

where n is a number from 2 to 10.

If desired, the cycloolefin polymers may contain from 0 to 99% by weight, based on the total weight of the cycloolefin polymers, of polymerized units of an acyclic olefin of the formula VIII:

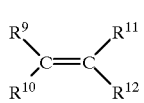

where $R^9$, $R^{10}$, $R^{11}$ and $R^{12}$ are identical or different and are a hydrogen atom or $C_1$–$C_{10}$-hydrocarbon radical, e.g. a $C_1$–$C_8$-alkyl radical or $C_6$–$C_{14}$-aryl radical.

Cycloolefin polymers which are obtained by ring-opening polymerization of at least one of the monomers of the formulae I to VI, followed by hydrogenation, are likewise suitable.

Cycloolefin homopolymers are built up from one monomer of the formulae I–VI. For the purposes of this invention, preference is given to cycloolefin copolymers which comprise at least one cycloolefin of the formulae I to VI and acyclic olefins of the formula VIII as comonomer. Acyclic olefins preferred here are those having from 2 to 20 carbon atoms, in particular unbranched acyclic olefins having from 2 to 10 carbon atoms, such as ethylene, propylene and/or butylene. The proportion of polymerized units of acyclic olefins of the formula VIII is up to 99% by weight, preferably from 5 to 80% by weight, particularly preferably from 10 to 60% by weight, based on the total weight of the respective cycloolefin polymers.

Preferred cycloolefin polymers among those described above are in particular those which contain polymerized units of polycyclic olefins based on the norbornene structure, particularly preferably norbornene or tetracyclododecene. Preference is also given to cycloolefin copolymers which contain polymerized units of acyclic olefins, in particular ethylene. Particular preference is given to norbornene-ethylene and tetracyclododecene-ethylene copolymers which contain from 5 to 80% by weight, preferably 10 to 60% by weight, of ethylene (based on the weight of the copolymer).

The cycloolefin polymers described above generally have glass transition temperatures $T_g$ of from $-20°$ C. to $400°$ C., preferably from 50 to $200°$ C. The viscosity number (Decalin, $135°$ C., DIN 53728) is generally from 0.1 to 200 ml/g, preferably from 50 to 150 ml/g.

The preparation of these cycloolefin polymers is carried out using heterogeneous or homogeneous catalysis with organometallic compounds, and is described in many publications. Suitable catalyst systems based on mixed catalysts made from titanium and/or vanadium compounds in combination with organylaluminum compounds are described in DD 109 224, DD 237 070 and EP-A 0 156 464. EP-A-0 283 164, EP-A-0 407 870, EP-A-485 893 and EP-A-0 503 422 describe the preparation of cycloolefin polymers using catalysts based on soluble metallocene complexes. The processes for preparation of cycloolefin polymers described in these texts are hereby expressly incorporated herein by way of reference.

The novel film has, besides the base layer described above, at least one outer layer, and preferably outer layers on both sides. This/these outer layer(s) is/are also built up essentially from the cycloolefin polymers described above for the base layer. It is important for the purposes of the invention that the outer layer comprises at least two different cycloolefin polymers, $COP_1$ and $COP_2$, selected from those described above for the base layer and which differ in their glass transition temperature. The difference is glass transition temperatures $Tg_1$ and $Tg_2$ is at least $5°$ C., preferably at least from 10 to $150°$ C., in particular from 20 to $100°$ C., where $Tg_2 > Tg_1$.

It is moreover advantageous if the higher glass transition temperature $Tg_2$ of $COP_2$ is also above the glass transition temperature Tg of the cyclolefin polymer on the base layer, preference being given here to a difference of at least $5°$ C., particularly preferably at least from 10 to $150°$ C., in particular from 20 to $100°$ C., where $Tg_2 > Tg$.

Surprisingly, it has been found that adding a cycloolefin polymer $COP_2$ having higher glass transition temperature $Tg_2$ in the outer layer(s) creates a rough surface when the film is oriented. The surface roughness of the film can be adjusted precisely and matched to any particular requirements by varying the type and amount of the cycloolefin polymer $COP_2$ having a higher glass transition temperature. By using this measure, it is possible to dispense with the particulate antiblocking agents commonly used. The novel form is easier to metalize and to process than comparable films having particulate antiblocking agents. It has been found that the added $COP_2$ does not form separate particles in the outer layer but, surprisingly, despite this gives a roughened film surface. Unexpectedly, the roughened surface of the novel film is distinguished by particularly uniform surface roughness.

Furthermore, the dielectric dissipation factors found are much lower than those of films made from cycloolefin polymers with usual particulate antiblocking agents.

The outer layer generally comprises in total at least from 90 to 100% by weight, preferably from 95 to 99% by weight, in particular from 98 to 99% by weight, based in each case on the weight of the outer layer. These data refer to the total content of cycloolefin polymer ($COP_2$ and $COP_1$). If desired, effective amounts of customary additives may also be present in the outer layer.

The outer layer generally contains from 0.5 to 25% by weight, preferably from 2 to 15% by weight, in particular from 5 to 10% by weight, based in each case on the weight of the outer layer, of the cycloolefin polymer $COP_2$ having increased glass transition temperature $Tg_2$. The proportion of the cycloolefin polymer $COP_1$ having $Tg_1$ is not more than from 99.5 to 75% by weight, preferably from 98 to 85% by weight, in particular from 95 to 90% by weight, based in each case on the weight of the outer layer.

The outer layer mixture of $COP_1$ and $COP_2$ may be prepared by the usual known processes, such as mechanical mixing of powder or granules or extrusion mixing followed by granulation.

As mentioned above, the individual layers of the film may also contain, besides cycloolefin polymers, effective amounts of suitable additives. In principle, any additive is suitable which is customarily used in polyolefin films, such as polyethylene or polypropylene films. The outer layer formulation according to the invention allows known customary antiblocking agents to be dispensed with. The use of lubricants and antistats, which is usual in packaging film, should be avoided in capacitor applications since these additives impair electrical properties. For capacitor films, therefore, preference is given to stabilizers, neutralizing agents and antioxidants.

Preferred neutralizing agents are dihydrotalcite, calcium stearate and/or calcium carbonate of a mean particle size of not more than 0.7 μm, an absolute particle size of less than 10 μm and a specific surface area of at least 40 m²/g. The neutralizing agent is generally added in an amount of from 0.02 to 0.1% by weight.

Examples of UV stabilizers are absorbers, such as hydroxyphenylbenzotriazoles, hydroxybenzophenones, formamidine or benzylidenecamphor, quenchers, such as cinnamates or nickel chelates, free-radical scavengers, such as sterically hindered phenols, hydroperoxide decomposers, such as the nickel or zinc complexes of sulfur-containing compounds, HALS type light stabilizers or mixtures of these.

Stabilizers which can be used are the usual stabilizing compounds for polymers of ethylene, propylene and other olefins. They are added in amounts of from 0.05 to 2% by weight. Phenolic stabilizers, alkali metal/alkaline earth metal stearates and/or alkali metal/alkaline earth metal carbonates are particularly suitable. Preference is given to phenolic stabilizers having a molar mass of more than 500 g/mol, and in an amount of from 0.1 to 0.6% by weight, in particular from 0.15 to 0.4% by weight. Pentaerythritol tetrakis-3-(3,5-di-tert-butyl-4-hydroxyphenyl)propionate or 1,3,5-trimethyl-2,4,6-tris(3,5-di-tert-butyl-4-hydroxybenzyl)benzene are particularly advantageous.

Examples of antioxidants which may be used are free-radical scavengers, such as substituted phenols and aromatic amines and/or peroxide decomposers, such as phosphites, phosphates and thio compounds.

The total thickness of the novel film is generally from 2 to 50 μm, preferably from 3 to 30 μm. The base layer is the layer which makes up at least 50% of the total film thickness. The thickness of the outer layer(s) is/are from 0.1 to 5 μm, preferably from 0.5 to 3 μm, in particular from 0.5 to 1 μm. Preferred embodiments have outer layers on both sides, and these may have identical or different constructions. Preference is given to three-layer films having identical outer layers, i.e. of symmetrical construction.

The invention further provides a process for producing the novel film. The production is preferably carried out in the usual manner known to the person skilled in the art, by extrusion or by the coextrusion process known per se.

In this process, as usual in coextrusion, the polymer or polymer mixture of the individual layers is compressed, melted and liquefied in an extruder, the additives which may, if desired, be added may already be present in the polymer or polymer mixture or be added using a masterbatch technique. The polymer mixture for the outer layer is preferably prepared in a separate step. It is also possible, if desired, to mix the components for the outer layers in the extruder. The melts corresponding to the individual layers of the film are then coextruded together and simultaneously through a flat film extrusion die, and the extruded film having more than one layer is drawn off on one or more take-off rolls, and during this cools and solidifies. The take-off roll temperature is generally in the range from 20 to 180° C., preferably from 60 to 130° C.

The resultant film is then stretched parallel to and perpendicular to the direction of extrusion, giving an orientation of the molecular chains. The stretching ratio in the longitudinal direction is preferably from 1.1:1 to 4:1, and in the transverse direction preferably from 2:1 to 5:1. The longitudinal stretching is expediently carried out with the help of two rolls running at different speeds corresponding to the desired stretching ratio, and the transverse stretching with an appropriate tenter frame. It is, however, also possible in principle to use other known stretching technologies to orient the film.

The biaxial orientation is usually followed by a heat setting (heat treatment), and finally the film is reeled. To increase surface tension, one or both surfaces of the film may, if desired, be corona- or flame-treated by one of the known methods, after the biaxial orientation.

The temperatures at which the film is oriented in the longitudinal and/or transverse direction here should be matched to the respective cycloolefin polymer grades used, and in particular to their glass transition temperatures. Both the longitudinal stretching temperature $T_l$ and the transverse stretching temperature $T_q$ here depend on the formulation of the base layer and also on $Tg_1$ of $COP_1$ and $Tg_2$ of $COP_2$ of the outer layer.

Both $T_l$ and $T_q$ must be at least 5° C., preferably from 10 to 150° C., above the Tg of the COP of the base layer and $Tg_1$ of $COP_1$ of the outer layer. In the case of COP mixtures in the base layer, there must be sufficient heating for the polymer mixture of the base layer to be orientable. The stretching temperatures then generally depend on the main component having the highest Tg in the base layer.

To achieve the required surface roughness of the film, the stretching temperatures $T_l$ and $T_q$ should additionally take into account the glass transition temperature of the $COP_2$ used in the outer layer. The stretching temperatures of the stretching process carried out first (i.e. usually $T_l$) should be at least 3° C., preferably at least 5° C., below the glass transition temperature $Tg_2$ of $COP_2$. In principle, $T_q$ may be chosen independently of $Tg_2$, so that $T_q$ may be above or below $Tg_2$. At the same time care should be taken, however, that the stretching temperatures here, as described above, are above the glass transition temperatures Tg and $Tg_1$ of the other cycloolefin polymers. These conditions should be met in order to give the film good orientability and the desired surface roughness without additional antiblocking agents.

It is likely that admixing in the outer layer(s) of the cycloolefin polymer $COP_2$ having increased glass transition temperature $Tg_2$ breaks up the surface layers during the orientation process, and thus gives a roughened surface without the formation of separate particles of $COP_2$. Surprisingly, the surface roughness can be adjusted within wide limits in the present invention by varying the type and amount of cycloolefin polymers used in the outer layer(s); this gives good sliding friction values and dielectric dissipation factors better than when customary antiblocking agents are used.

The novel film may be metallized using customary processes known to the person skilled in the art. The metal layer applied to at least one surface layer of the film during metallizing may consist of any suitable metal. Preference is given to layers of aluminum, zinc, gold or silver or appropriate alloys, aluminum or aluminum-containing alloys being particularly preferred. Suitable metallizing processes are electroplating, sputtering and vacuum metallization, vacuum metallization being preferred. The thickness of the metal layer is from about 20 to 600 nm, preferably from 25 to 100 nm.

Before metallizing, the film may, if desired, be surface-treated by means of flame or corona. It is, however, also possible to provide the novel film with a metal layer without any prior measure to increase its surface energy. The advantage of this embodiment is that the cycloolefin polymer film can also be metallized on both sides and not only on one side. Capacitors may be produced by customary processes from the metallized cycloolefin polymer films.

The invention will now be explained in more detail using working examples.

EXAMPLE 1

(Preparation of $COP_1$ and/or COP having Tg of 140° C.)

A 1.5 dm$^3$ flask was charged with 1 liter of petroleum fraction (boiling range from 90 to 110° C.) and 20 ml of methylaluminoxane solution in toluene (10.1% by weight of methylaluminoxane having molar mass of 1300 g/mol, determined cryoscopically) and stirred for about 30 min at 70° C. to remove any contaminants present. After the solution had been drained off, the reactor was charged with 480 cm$^3$ of an 85 percent by weight solution of norbornene in toluene. The solution was saturated with ethylene by repeated pressurization with ethylene (6 bar G), and then 10 cm$^3$ of the toluene solution of methylaluminoxane were added to the reactor and the mixture stirred for 5 minutes at 70° C. After 15 minutes' preactivation, a solution of 5.43 mg of isopropylene-(1-cyclopentadienyl)(1-indenyl)zirconium dichloride in 10 cm$^3$ of methylaluminoxane solution in toluene was added. The mixture was polymerized with stirring (750 rpm) at 70° C. for 30 minutes, further ethylene being metered in to maintain the ethylene pressure at 18 bar G. The homogeneous reaction solution was drained off into a vessel and mixed with about 1 ml of water. The solution was then mixed with a filtration aid and filtered through a pressure filter. This solution was poured rapidly into 5 dm$^3$ of acetone, stirred for 10 min and filtered. The resultant solid was washed with acetone. The polymer was filtered off again and dried for 15 hours at 80° C. and a pressure of 0.2 bar.

This gave 89.1 g of a colorless polymer. To determine the viscosity number, 0.1 g of the polymer was dissolved in 100 ml of decalin, and measurements were taken on the solution in a capillary viscometer at 135° C. The viscosity number was 56.5 dl/g. The glass transition temperature was determined using a Perkin Elmer DSC7. Determination from the 2nd heating curve at a heating rate of 20° C./min gave a glass transition temperature of 140° C. The ethylene content was determined as 49 mol %, using $^{13}C$ nuclear magnetic resonance spectroscopy. The molecular weight of the polymer was determined using gel permeation chromatography in orthodichlorobenzene at 135° C. Polyethylene fractions were used as standard. The following values were found for the polymer. $M_n$: 21,500 g/mol; $M_w$: 45,000 g/mol; $M_w/M_n$: 2.1.

EXAMPLE 2

(Preparation of $COP_2$ having Tg of 165° C.)

The polymer was prepared by the process described in Example 1. The ethylene pressure was set at 5 bar G and 4.78 mg of isopropylene-(9-fluorenyl) cyclopentadienylzirconium dichloride were used as catalyst. After the polymer had been isolated, the following quantities and properties were found:

yield: 56 g; solution viscosity: 81 ml/g; glass transition temperature: 163° C., ethylene content: 45 mol percent; molecular weight: $M_n$: 43,900 g/mol, $M_w$: 83,800 g/mol; $M_w/M_n$: 1.9.

EXAMPLE 3

(Preparation of a mixture of $COP_1$ and $COP_2$)

A mixture of 16 kg of $COP_1$ and 4 kg of $COP_2$ was extruded in a twin-screw extruder at a melt temperature of 240° C., and the hardened extrudate was then granulated. This gave 19.2 kg of colorless, cloudy granules. The DSC study gave a glass transition temperature of 139° C. ($Tg_1$) and another, less strongly marked, glass transition at 164° C. ($Tg_2$).

EXAMPLE 4

(Preparation of a mixture of $COP_1$ and Syloblock 44)

A mixture of 16 kg of $COP_1$ and 4 kg of Syloblock 44 (W. R. Grace) was extruded in a twin-screw extruder at a melt temperature of 240° C., and the hardened extrudate was then granulated. This gave 19.3 kg of colorless, cloudy granules. The DSC study gave a glass transition temperature of 139° C. ($Tg_1$).

EXAMPLES 5, 6, 7

A three-layer film having an ABA layer construction, i.e. the base layer B is surrounded by two identical outer layers A, was produced by coextrusion followed by stepwise orientation in the longitudinal and transverse direction.

The base layer B consisted essentially of the $COP_1$ described in Example 1 and contained 0.2% by weight of a phenolic stabilizer. Each of the two outer layers consisted essentially of 98% by weight of the $COP_1$ from Example 1 and 2% by weight of the $COP_2$ from Example 2, (based on the total weight of the cycloolefin copolymers in the respective outer layer) and 0.2% by weight of a phenolic stabilizer (based on the total weight of the outer layer).

The individual layers of the film were extruded together through a flat film die at an extrusion temperature of 230° C. and a die temperature of 240° C. The emerging melt stream was drawn off on a take-off roll at 90° C. and then oriented in the longitudinal direction at a temperature of from 150 to 160° C. (longitudinal stretching ratio: 2.0) and then at a temperature of from 170° C. to 175° C. in the transverse direction (transverse stretching ratio: 3.2) before being reeled.

The properties measured on the films produced in this way are given in Table 1. The films had excellent reeling behavior with no tendency to block.

COMPARATIVE EXAMPLES 8 AND 9

A three-layer film having an ABA layer construction, i.e. the base layer B is surrounded by two identical outer layers A, was produced by coextrusion followed by stepwise orientation in the longitudinal and transverse direction.

The base layer B consisted essentially of the $COP_1$ described in Example 1 and contained 0.2% by weight of a phenolic stabilizer. The two outer layers likewise essentially consisted of the $COP_1$ of Example 1 and 0.2% by weight of a phenolic stabilizer.

As described in Examples 5–7, base and outer layers were firstly extruded at an extruder temperature of 230° C. and a die temperature of 240° C. onto a take-off roll at 90° C. and then oriented in the longitudinal direction at a temperature of from 150 to 160° C. (longitudinal stretching ratio: 2.0) and then at a temperature of from 170° C. to 175° C. in the transverse direction (transverse stretching ratio: 3.2) before being reeled.

The properties measured on the films produced in this way are given in Table 1. The films had high mutual friction and therefore could not be reeled without creasing.

COMPARATIVE EXAMPLES 10 AND 11

(Production of a biaxially oriented film from $COP_1$ and Syloblock 44 as additive in the outer layer)

A three-layer film having an ABA layer construction, i.e. the base layer B is surrounded by two identical outer layers A, was produced by coextrusion followed by stepwise orientation in the longitudinal and transverse direction.

The base layer B consisted essentially of the $COP_1$ described in Example 1 and contained 0.2% by weight of a phenolic stabilizer. Each of the two outer layers consisted essentially of 99.6% by weight of the $COP_1$ from Example 1 and 0.4% by weight of Syloblock 44, (based on the total weight of the cycloolefin copolymers $COP_1$ in the respective outer layer) and 0.2% by weight of a phenolic stabilizer (based on the total weight of the outer layer).

Base and outer layers were firstly extruded at an extruder temperature of 230° C. and a die temperature of 240° C. onto a take-off roll at 90° C., and then oriented in the longitudinal direction at a temperature of from 150 to 160° C. (longitudinal stretching ratio: 2.0) and then at a temperature of from 170° C. to 175° C. in the transverse direction (transverse stretching ratio: 3.2) before being reeled. The films produced in this way had the properties shown in Table 1.

COMPARATIVE EXAMPLE 12

A film was produced as in Comparative Examples 10 and 11, except that the concentration of Sylobloc 44 in the outer layer was lowered to 0.15% by weight (based on the total weight of the cycloolefin copolymers $COP_1$ and $COP_2$). The thickness of the film was 6 μm. The film formulation and process conditions corresponded to those of Comparative Examples 10 and 11.

The novel films (Examples 5–7) are distinguished by low coefficients of sliding friction, these being markedly lower than the values achievable using Syloblock 44. At the same time, Examples 5–7 show markedly lower dissipation factors than those of Sylobloc-containing films. Test Examples 8–9 show that comparably low dissipation values are also achievable only/merely for COC films containing no antiblocking agents. These films, however, are not usable in practice because of their strong tendency to block and their high sliding friction values. They cannot be reeled without creasing and they block during unreeling and all further processes.

TABLE 1

Properties of the biaxially oriented films in Examples and Comparative Examples

| Example | E 5 | E 6 | E 7 | CE 8 | CE 9 | CE 10 | CE 11 | CE 12 |
|---|---|---|---|---|---|---|---|---|
| Thickness [μm] | 23 | 12 | 8 | 20 | 11 | 12 | 8 | 6 |
| Modulus of elasticity (N/mm²) | | | | | | | | |
| MD | 3200 | 3300 | 3300 | 3400 | 3100 | 3100 | 3200 | 3400 |
| TD | 3400 | 3700 | 3900 | 3500 | 3500 | 3700 | 3600 | 3500 |
| Tear strength (N/mm²) | | | | | | | | |
| MD | 80 | 90 | 80 | 71 | 51 | 51 | 55 | 66 |
| TD | 120 | 150 | 160 | 110 | 76 | 76 | 84 | 61 |
| Elongation at break (%) | | | | | | | | |
| MD | 5 | 41 | 23 | 82 | 70 | 14 | 28 | 32 |
| TD | 66 | 47 | 51 | 48 | 50 | 33 | 39 | 23 |

TABLE 1-continued

Properties of the biaxially oriented films in Examples and Comparative Examples

| Example | E 5 | E 6 | E 7 | CE 8 | CE 9 | CE 10 | CE 11 | CE 12 |
|---|---|---|---|---|---|---|---|---|
| Coefficient of sliding friction (Ro/Ri) | 0.5 | 0.39 | 0.39 | >1.0 | >1.0 | 0.85 | 0.9 | 0.8 |
| Dielectric dissipation factor at 23° C. and 50% relative humidity | | | | | | | | |
| 0.1 kHz | — | — | $0.6*10^{-4}$ | $<0.5*10^{-4}$ | $<0.5*10^{-4}$ | — | $2.1*10^{-4}$ | $0.5*10^{-4}$ |
| 1.0 kHz | — | — | $0.6*10^{-4}$ | $<0.5*10^{-4}$ | $<0.5*10^{-4}$ | — | $3.4*10^{-4}$ | $1.2*10^{-4}$ |
| 10 kHz | — | — | $2.1*10^{-4}$ | $<0.5*10^{-4}$ | $<0.5*10^{-4}$ | — | $4.0*10^{-4}$ | $1.5*10^{-4}$ |
| Perthometer | Ri/Ro | Ri/Ro | Ri/Ro | Ri/Ro | Ri/Ro | Ri/Ro | Ri/Ro | Ri/Ro |
| Rz(μm) | 0.50/0.42 | 0.87/0.99 | 0.88/0.80 | 0.13/0.02 | 0.30/0.25 | 1.16/1.54 | 1.44/1.55 | 1.64/1.66 |
| Ra(μm) | 0.10/0.08 | 0.17/0.16 | 0.15/0.13 | 0.08/0.01 | 0.03/0.03 | 0.18/0.24 | 0.20/0.23 | 0.20/0.19 |
| Content of $COP_2$ or antiblocking agent (% by weight) | 2 | 2 | 2 | — | — | 0.4 | 0.4 | 0.15 |
| | $COP_2$ | $COP_2$ | $COP_2$ | | | Sylobloc | Sylobloc | Sylobloc |

Ri: inner side of film
Ro: outer side of film

The following measurement methods were used to obtain values for the raw materials and films:

Viscosity number J

The viscosity number is a measure of the molar mass and is measured according to DIN 53 728, Part 4, in 0.1% decahydronaphthalene solution at 135° C.

Glass transition temperature

The glass transition temperatures were measured according to DIN 53 765 from the 2nd heating curve at 20° K./min.

Ethylene content

The ethylene content of the COPs were determined by $^{13}C$ NMR.

Molecular weight determination ($M_w$ and $M_n$)

The molecular weights of these specimens were determined using gel permeation chromatography with polyethylene as standard. The eluant was o-dichlorobenzene at a temperature of 135° C. A Waters 150-C ALC/GPC was used with a Jerdi column system (500×10 mm, linear) and an RI-64 catheter.

Sliding friction

Determination of sliding friction was based on DIN 53375 and was measured for the films with the outer side of the film against the inner side. The coefficient of sliding friction was determined (at 23° C. and 50% relative humidity) about 14 days after film production.

Surface roughness

Surface roughness was measured according to DIN 4768 with a cut-off of, respectively, 0.25 mm and 0.08 mm.

Tear strength and elongation at break

The tear strength and elongation at break were determined according to DIN 53455.

Modulus of elasticity

The modulus of elasticity was determined according to DIN 53 457 or ASTM 882.

Dissipation factor

Determined according to DIN 53483 at 23° C. and 50% relative humidity using a measurement voltage of 1 volt and vapor-deposited silver electrodes (20 cm², 150 nm layer thickness).

We claim:

1. A film which comprises more than one layer and made from cycloolefin polymers and having a base layer and at least one outer layer, the base layer being made essentially from cycloolefin polymers ("COPs") having a glass transition temperature Tg and the outer layer being made essentially from a mixture of cycloolefin polymers, wherein the mixture of cycloolefin polymers comprises at least two cycloolefin polymers $COP_1$ and $COP_2$ whose glass transition temperatures $Tg_1$ and $Tg_2$ differ by at least 5° C., where $Tg_2-Tg_1 \geq 5°$ C. and at the same time the condition $Tg_2-Tg \geq 5°$ C. is fulfilled.

2. A film as claimed in claim 1, wherein the base layer comprises from 90 to 100% by weight of cycloolefin polymer or a cycloolefin polymer mixture and optionally additives.

3. A film as claimed in claim 1, wherein the cycloolefin polymer of the base layer comprises from 0.1 to 100% by weight based in each case on the total weight of the cycloolefin polymer, of polymerized cycloolefin units of the formulae I, II, III, IV, V or VI:

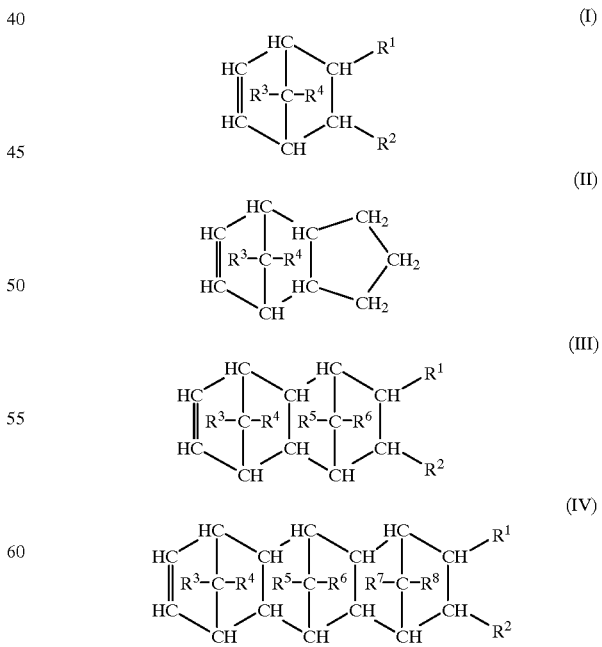

-continued

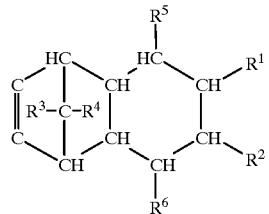
(V)

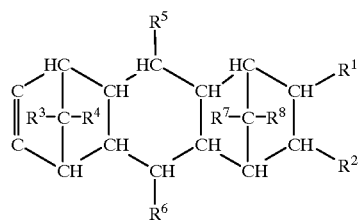
(VI)

where $R^1$, $R^2$, $R^3$, $R^4$, $R^5$, $R^6$, $R^7$ and $R^8$ are identical or different and are a hydrogen atom or a $C_1$–$C_{30}$-hydrocarbon radical or where two or more radicals $R^1$ to $R^8$ are bonded in a ring, and where the meaning of the same radical may be different in different formulae.

4. A film as claimed in claim 3, wherein the cycloolefin polymer of the base layer is a cycloolefin copolymer and contains up to 45% by weight, based on the total weight of the cycloolefin copolymer, of polymerized units of at least one monocyclic olefin of the formula VII:

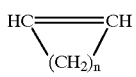
(VII)

where n is a number from 2 to 10.

5. A film as claimed in claim 3, wherein the cycloolefin polymer of the base layer is a cycloolefin copolymer and contains up to 99% by weight, based on the total weight of the cycloolefin copolymer, of polymerized units of an acyclic olefin of the formula VIII:

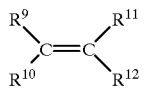
(VIII)

where $R^9$, $R^{10}$, $R^{11}$ and $R^{12}$ are identical or different and are a hydrogen atom or $C_1$–$C_{14}$-hydrocarbon radical.

6. A film as claimed in claim 1, wherein the cycloolefin polymer of the base layer is a norbornene-ethylene copolymer or tetracyclododecene-ethylene copolymer having an ethylene content of from 5 to 80% by weight, based on the weight of the copolymer.

7. A film as claimed in claim 1, wherein the cycloolefin polymer of the base layer has a glass transition temperature $T_g$ of from –20° C. to 400° C., and a viscosity number of from 0.1 to 200 ml/g.

8. A film as claimed in claim 1, wherein the glass transition temperatures $Tg_1$ and $Tg_2$ of the cycloolefin polymers $COP_1$ and $COP_2$ differ by at least from 5 to 150° C., and $Tg_1 < Tg_2$.

9. A film as claimed in claim 1, wherein the outer layer comprises from 90 to 100% by weight of cycloolefin polymers $COP_1$ and $COP_2$, the proportion of $COP_1$ being from 99.5 to 75% by weight and the proportion of $COP_2$ being from 0.5 to 25% by weight, based in each case on the weight of the outer layer.

10. A film as claimed in claim 1, wherein the cycloolefin polymer $COP_1$ comprises from 0.1 to 100% by weight based in each case on the total weight of the cycloolefin polymer, of polymerized cycloolefins units of the formulae I, II, III, IV, V or VI

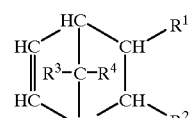
(I)

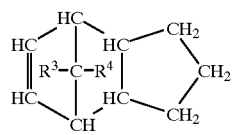
(II)

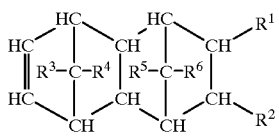
(III)

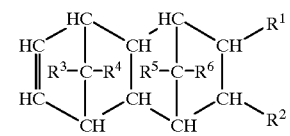
(IV)

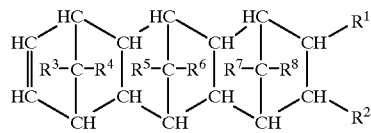
(V)

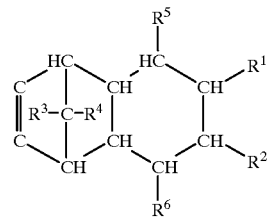
(VI)

where $R^1$, $R^2$, $R^3$, $R^4$, $R^5$, $R^6$, $R^7$ and $R^8$ are identical or different and are a hydrogen atom or a $C_1$–$C_{30}$-hydrocarbon radical or where two or more radicals $R^1$ to $R^8$ are bonded in a ring, and where the meaning of the same radical may be different in different formulae.

11. A film as claimed in claim 10, wherein the cycloolefin polymer $COP_1$ is a cycloolefin copolymer and contains up to 45% by weight, based on the total weight of the cycloolefin copolymer, of polymerized units of at least one monocyclic olefin of the formula VII:

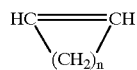

(VII)

where n is a number from 2 to 10.

12. A film as claimed in claim 10, wherein the cycloolefin polymer $COP_1$ is a cycloolefin copolymer and contains up to 99% by weight, based on the total weight of the cycloolefin copolymer, of polymerized units of an acyclic olefin of the formula VIII:

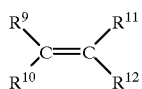

(VIII)

where $R^9$, $R^{10}$, $R^{11}$ and $R^{12}$ are identical or different and are a hydrogen atom or $C_1$–$C_{14}$-hydrocarbon radical,.

13. A film as claimed in claim 12, wherein the cycloolefin polymer $COP_2$ comprises from 0.1 to 100% by weight based in each case on the total weight of the cycloolefin polymer, of polymerized cycloolefin units of the formulae I, II, III, IV, V or VI

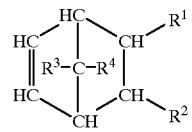

(I)

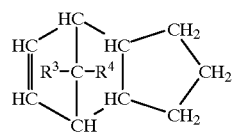

(II)

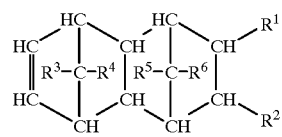

(III)

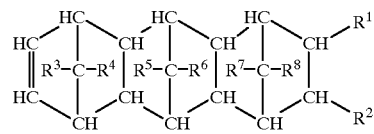

(IV)

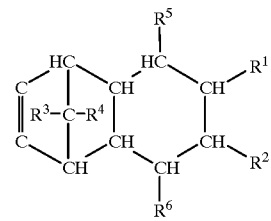

(V)

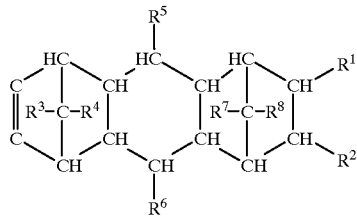

(VI)

where $R^1$, $R^2$, $R^3$, $R^4$, $R^5$, $R^6$, $R^7$ and $R^8$ are identical or different and are a hydrogen atom or a $C_1$–$C_{30}$-hydrocarbon radical or where two or more radicals $R^1$ to $R^8$ are bonded in a ring, and where the meaning of the same radical may be different in different formulae.

14. A film as claimed in claim 13, wherein the cycloolefin polymer $COP_2$ is a cycloolefin copolymer and contains up to 45% by weight, based on the total weight of the cycloolefin copolymer, of polymerized units of at least one monocyclic olefin of the formula VII:

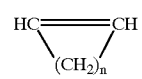

(VII)

where n is a number from 2 to 10.

15. A film as claimed in claim 13, wherein the cycloolefin polymer $COP_2$ is a cycloolefin copolymer and contains up to 99% by weight, based on the total weight of the cycloolefin copolymer, of polymerized units of an acyclic olefin of the formula VIII:

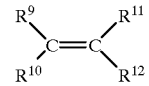

(VIII)

where $R^9$, $R^{10}$, $R^{11}$ and $R^{12}$ are identical or different and are a hydrogen atom or $C_1$–$C_{14}$-hydrocarbon radical,.

16. A film as claimed in claim 1, wherein the base layer and/or the outer layer contain stabilizers, neutralizing agents and/or antioxidants.

17. A film as claimed in claim 1, wherein the film has a total thickness of from 2 to 50 μm, the thickness of the outer layer(s) being from 0.1 to 5 μm.

18. A film as claimed in claim 1, wherein the film has outer layers on both sides.

19. A film as claimed in claim 1, wherein the outer layer(s) do(es) not contain particulate antiblocking agents.

20. A process for producing a film as claimed in claim 1, which comprises coextruding the melts corresponding to the individual film layers through a flat film die, drawing off the coextruded film over a take-off roll, biaxially stretching the film using a longitudinal stretching ratio of from 1.1:1 to 4:1 and a transverse stretching ratio of from 2:1 to 5:1, heat-setting the biaxially stretched film, optionally corona- or flame-treating the film and then reeling it.

21. The process as claimed in claim 20, wherein the film is oriented at a longitudinal stretching temperature $T_l$ and at a transverse stretching temperature $T_q$, where $T_l$ and $T_q$ are at least 5° C. above Tg of the cycloolefin polymer COP of the base layer and, at the same time, $T_l$ is at least 3° C. below $Tg_2$ of the cycloolefin polymer $COP_2$ of the outer layer.

22. A capacitor which comprises the film as claimed in claim 1.

23. A process to produce a metallized film which comprises applying a metal layer to at least one side of said film as claimed in claim 1.

24. The film as claimed in claim 1, which further comprises a metal layer applied to at least one side of said film.

25. A film as claimed in claim 6, wherein the cycloolefin polymer of the base layer has a glass temperature $T_g$ of from −50 to 200° C. and a viscosity number of from 50 to 150 ml/g.

26. The process as claimed in claim 23, wherein said film has a metal layer on both sides.

27. A film as claimed in claim 3, wherein the cycloolefin copolymer of the base polymer comprises from 10 to 99% by weight based in each case on the total weight of the cycloolefin copolymer of polymerized cycloolefin units of the formulae I, II, III, IV, V or VI.

28. A film as claimed in claim 10, wherein the cycloolefin copolymer of the base polymer comprises from 10 to 99% by weight based in each case on the total weight of the cycloolefin copolymer of polymerized cycloolefin units of the formulae I, II, III, IV, V or VI.

29. A film as claimed in claim 13, wherein the cycloolefin copolymer of the base polymer comprises from 10 to 99% by weight based in each case on the total weight of the cycloolefin copolymer of polymerized cycloolefin units of the formulae I, II, III, IV, V or VI.

* * * * *